(12) United States Patent
Guo et al.

(10) Patent No.: US 10,044,775 B2
(45) Date of Patent: Aug. 7, 2018

(54) CALCULATING AN ENTITY'S LOCATION SIZE VIA SOCIAL GRAPH

(71) Applicant: Microsoft Technology Licensing, LLC, Redmond, WA (US)

(72) Inventors: Songtao Guo, Cupertino, CA (US); Baoshi Yan, Belmont, CA (US); Alex Ching Lai, Menlo Park, CA (US); Ke Wang, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/474,009

(22) Filed: Aug. 29, 2014

(65) Prior Publication Data

US 2016/0065628 A1   Mar. 3, 2016

(51) Int. Cl.
*G06F 15/16*   (2006.01)
*H04L 29/06*   (2006.01)
(Continued)

(52) U.S. Cl.
CPC ....... *H04L 65/403* (2013.01); *G06Q 30/0201* (2013.01); *G06Q 50/01* (2013.01)

(58) Field of Classification Search
CPC ........ H04L 43/065; H04L 67/18; G06Q 50/01
See application file for complete search history.

(56) References Cited

U.S. PATENT DOCUMENTS 8,108,414 B2 *   1/2012   Stackpole ........... G06F 17/3087
                                                      707/758
8,606,787 B1   12/2013   Asgekar
(Continued)

FOREIGN PATENT DOCUMENTS

CN   105279597 A   1/2016
WO   WO-201217813 A3   12/2012
(Continued)

OTHER PUBLICATIONS

Dodaro (Dodaro, Melonie, NPL, 9 steps to getting started with the new linkedin contacts, Jun. 26, 2013, Top Dog Social Media, retrieved from http://topdogsocialmedia.com/how-to-use-linkedin-contacts/ on May 9, 2016, NPL printed using web.archive screen capture dated Jul. 22, 2013; hereinafter Dod).*
(Continued)

Primary Examiner — Michael A Keller
(74) Attorney, Agent, or Firm — Schwegman Lundberg & Woessner, P.A.

(57) ABSTRACT

Techniques for determining a location of an entity are described. A determination module using member profile data may determine the location of the entity. Member profile data can include information about a member's employer and the employer's location. The module accesses member profiles from a social network. Additionally, the module may create a subgroup of entity-related member profiles from the accessed member profiles. The entity-related member profiles can be associated with a specific entity. Furthermore, the module may determine a suggested location for the specific entity based on location information derived from the related member profiles. Moreover, the module may calculate a connection density for the specific entity based on connections associated with the entity-related member profiles. Subsequently, the module may determine that the suggested location is a physical location when the calculated connection density is above a predetermined threshold value.

19 Claims, 6 Drawing Sheets

(51) Int. Cl.
*G06Q 30/02* (2012.01)
*G06Q 50/00* (2012.01)

(56) References Cited

U.S. PATENT DOCUMENTS

| | | | |
|---|---|---|---|
| 9,578,094 | B1 | 2/2017 | Ranade |
| 2004/0122803 | A1 | 6/2004 | Dom et al. |
| 2006/0106638 | A1 | 5/2006 | Brown et al. |
| 2006/0194186 | A1 | 8/2006 | Nanda |
| 2007/0071146 | A1 | 3/2007 | Scaglione et al. |
| 2008/0082786 | A1 | 4/2008 | Lovell |
| 2011/0093420 | A1 | 4/2011 | Rothenberg et al. |
| 2011/0161260 | A1* | 6/2011 | Burges .............. G06F 17/30887 706/12 |
| 2011/0258049 | A1* | 10/2011 | Ramer .............. G06F 17/30867 705/14.66 |
| 2012/0259851 | A1 | 10/2012 | Jia et al. |
| 2012/0290399 | A1* | 11/2012 | England .............. G06Q 30/0282 705/14.66 |
| 2012/0296780 | A1* | 11/2012 | McEntire ............... G06Q 50/01 705/27.2 |
| 2013/0318180 | A1 | 11/2013 | Amin et al. |
| 2014/0075004 | A1 | 3/2014 | Van Dusen et al. |
| 2014/0195449 | A1 | 7/2014 | Komissarchik et al. |
| 2014/0280112 | A1* | 9/2014 | Cheng ................. G06F 17/3053 707/728 |
| 2014/0304254 | A1 | 10/2014 | Rubinstein et al. |
| 2015/0332314 | A1* | 11/2015 | Chakraborty .......... G06Q 50/01 705/14.45 |
| 2015/0363827 | A1* | 12/2015 | Tseng .................... G06Q 50/01 705/14.58 |
| 2015/0379113 | A1 | 12/2015 | Wang et al. |
| 2015/0379445 | A1 | 12/2015 | Wang et al. |
| 2015/0379535 | A1 | 12/2015 | Wang et al. |
| 2016/0065429 | A1 | 3/2016 | Wang et al. |

FOREIGN PATENT DOCUMENTS

| | | |
|---|---|---|
| WO | WO-2012178130 A2 | 12/2012 |
| WO | WO-2014074607 A2 | 5/2014 |
| WO | WO-2016003512 A1 | 1/2016 |

OTHER PUBLICATIONS

Samuelson (Samuelson, Maisy, Linkedin.com, Linkedin Official Blog, Now Companies too have profiles on LinkedIn!, Mar. 20, 2008, retrieved from https://blog.linkedin.com/2008/03/20/company-profile on May 10, 2016, NPL printed using web archive screen capture dated Jan. 11, 2012; hereinafter Sam).*

"International Application Serial No. PCT/US2015/023332, International Search Report dated Jul. 8, 2015", 2 pgs.
"International Application Serial No. PCT/US2015/023332, Written Opinion dated Jul. 8, 2015", 4 pgs.
"U.S. Appl. No. 14/473,988, Non Final Office Action dated May 16, 2016", 21 pgs.
"U.S. Appl. No. 14/473,988, Response filed Oct. 17, 2016 to Non Final Office Action dated May 16, 2016", 12 pgs.
"U.S. Appl. No. 14/672,948, Non Final Office Action dated May 17, 2017", 12 pgs.
"U.S. Appl. No. 14/587,047, Non Final Office Action dated Jul. 27, 2017", 24 pgs.
"U.S. Appl. No. 14/672,948, Response filed Jul. 27, 2017 to Non Final Office Action mailed May 17, 2017", 14 pgs.
"U.S. Appl. No. 14/473,988, Examiner Interview Summary dated Oct. 17, 2016", 3 pgs.
"U.S. Appl. No. 141473,988, Final Office Action dated Jan. 6, 2017", 19 pgs.
"U.S. Appl. No. 14/473,988, Response filed May 8, 2017 to Final Office Action dated Jan. 6, 2017", 13 pgs.
"International Application Serial No. PCT/US2015/023332, International Preliminary Report on Patentability dated Jan. 12, 2017", 6 pgs.
"U.S. Appl. No. 14/473,988, Non Final Office Action dated Nov. 21, 2017", 8 pgs.
"U.S. Appl. No. 14/587,047, Final Office Action dated Jan. 10, 2018", 36 pgs.
"U.S. Appl. No. 14/587,047, Response filed Nov. 27, 2017 to Non Final Office Action dated Jul. 27, 2017", 17 pgs.
"U.S. Appl. No. 14/672,948, Examiner Interview Summary dated Dec. 28, 2017", 3 pgs.
"U.S. Appl. No. 14/672,948, Final Office Action dated Nov. 1, 2017", 12 pgs.
"U.S. Appl. No. 14/672,948, Response filed Jan. 26, 2018 to Final Office Action dated Nov. 1, 2017", 14 pgs.
U.S. Appl. No. 14/473,988, filed Aug. 29, 2014, Surfacing an Entity's Physical Locations via Social Graph.
U.S. Appl. No. 14/587,047, filed Dec. 31, 2014, Determining a Function of an Entity.
U.S. Appl. No. 14/672,948, filed Mar. 30, 2015, Determining an Entity's Hierarchical Relationship via a Social Graph.
U.S. Appl. No. 14/672,833, filed Mar. 30, 2015, Determining a Relationship Type Between Disparate Entities.
"U.S. Appl. No. 14/587,047, Response filed Apr. 11, 2018 to Final Office Action dated Jan. 10, 2018", 20 pgs.
"U.S. Appl. No. 14/473,988, Response filed Mar. 21, 2018 to Non Final Office Action dated Nov. 21, 2017", 11 pgs.
"U.S. Appl. No. 14/473,988, Examiner Interview Summary dated Mar. 13, 2018", 3 pgs.

* cited by examiner

CALCULATING AN ENTITY'S LOCATION SIZE VIA SOCIAL GRAPH

TECHNICAL FILED

The subject matter disclosed herein generally relates to the processing of data. Specifically, the present disclosure generally relates to techniques for calculating an entity's location size via a social graph. For example, based on a connection density, number of members associated with a location, and penetration rate of the social network at the location, techniques are described to determine the number of employees at the location.

BACKGROUND

Social media and networking websites can maintain information on companies, organization, employees, and employers. The information may involve demographic information, such as publicly available information (e.g., name of entity, headquarters address, website of the company). However, some useful firmographic information may be missing or otherwise unavailable. Firmographic information can include: entity's physical locations; function of an entity's location; entity's location size; entity's hierarchical relationship; and type of relationships between disparate entities.

BRIEF DESCRIPTION OF THE DRAWINGS

Some embodiments are illustrated by way of example and not limitation in the figures of the accompanying drawings.

DETAILED DESCRIPTION

A member of a social network can create a member profile. The member profile can include a location associated with the member and an entity (e.g., employer) associated with the member. In addition to member profiles, a social network can have entity profiles (e.g., company pages) with information relating to an entity, which may also include office locations and number of employees.

In current implementations, an entity profile may only include demographic information, which can easily be accessed in the public domain. Demographic information about an entity can include a name of the entity; a headquarters location of the entity; and a website of the entity.

However, an entity profile may have firmographic information (e.g., for marketing purposes) that is not publicly available, but which can be derived from information available in the social network. Firmographic information can include office locations and the number of employees in each location. For example, an entity profile may only list the headquarters location, and may not list the location for its satellite offices. Additionally, an entity profile may not include the number of employees at each office location.

Using social graph information in the social network, embodiments of the present disclosure can determine firmographic information. Firmographic information can be information that is not easily ascertained from the public domain, such as, but not limited to, age of company, size of company, ownership of company, partnership between different companies, geographic locations (e.g., distribution center, headquarters), market, position, stage, trends, customers, property, parent company, and subsidiaries of a company. For example, privately held companies or closed corporations may not have publicly-released firmographic information.

Furthermore, firmographic information can be a set of characteristics associated with an entity. Firmographic information can be specialized to entities in a particular industry. Moreover, firmographic information can allow for comparison of entities in a similar industry.

Techniques described herein can determine and verify the actual office locations of an entity, and the number of employees at each office location. The determination and verification can be based on member profile data.

According to some embodiments, an entity profile can be created based on entity information determined from member profile data. For example, a member profile can include the name of the member's employer and the member's location, but the employer may not list the member's location as an office location.

The entity information can be determined based on information accessed from member profiles. The entity information can include: entity name; entity locations; website associated with the entity; country associated with the entity; region associated with the entity; industry associated with the entity; zip code associated with the entity; and number of members.

For example, when the entity is a company, the company profile can include information relating to the company's name, the office locations of the company (e.g., country, region, city, state, zip code), the website of the company, the industry associated with the company, and the number of employees with the company.

As previously mentioned, firmographic information can be determined through member profile data, which include connections e.g., first-degree, second-degree) between members. The connections can be analyzed using a connection density to determine the accuracy of the member profile data. Using the connection density, a determination can be made about an office location based on the analysis of the employees associated with the office location.

Additionally, the member profile data in a social network can be aggregated to determine firmographic information (e.g., location size) in order to generate an entity profile.

Furthermore, the firmographic information can be used to verify information about an entity. For example, a company profile created by a member can disclose that the company has 10,000 employees. The firmographic information derived from member profile data can verify the company size listed on the company profile.

Example methods and systems are directed to techniques for determining firmographic information based on member profile data and social graph data. More specifically, the present disclosure relates to methods, systems, and computer program products for calculating an entity's location size via social graph. Techniques for using connection density with social graph data can be used to determine and verify physical location and the actual number of employees associated with the entity.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
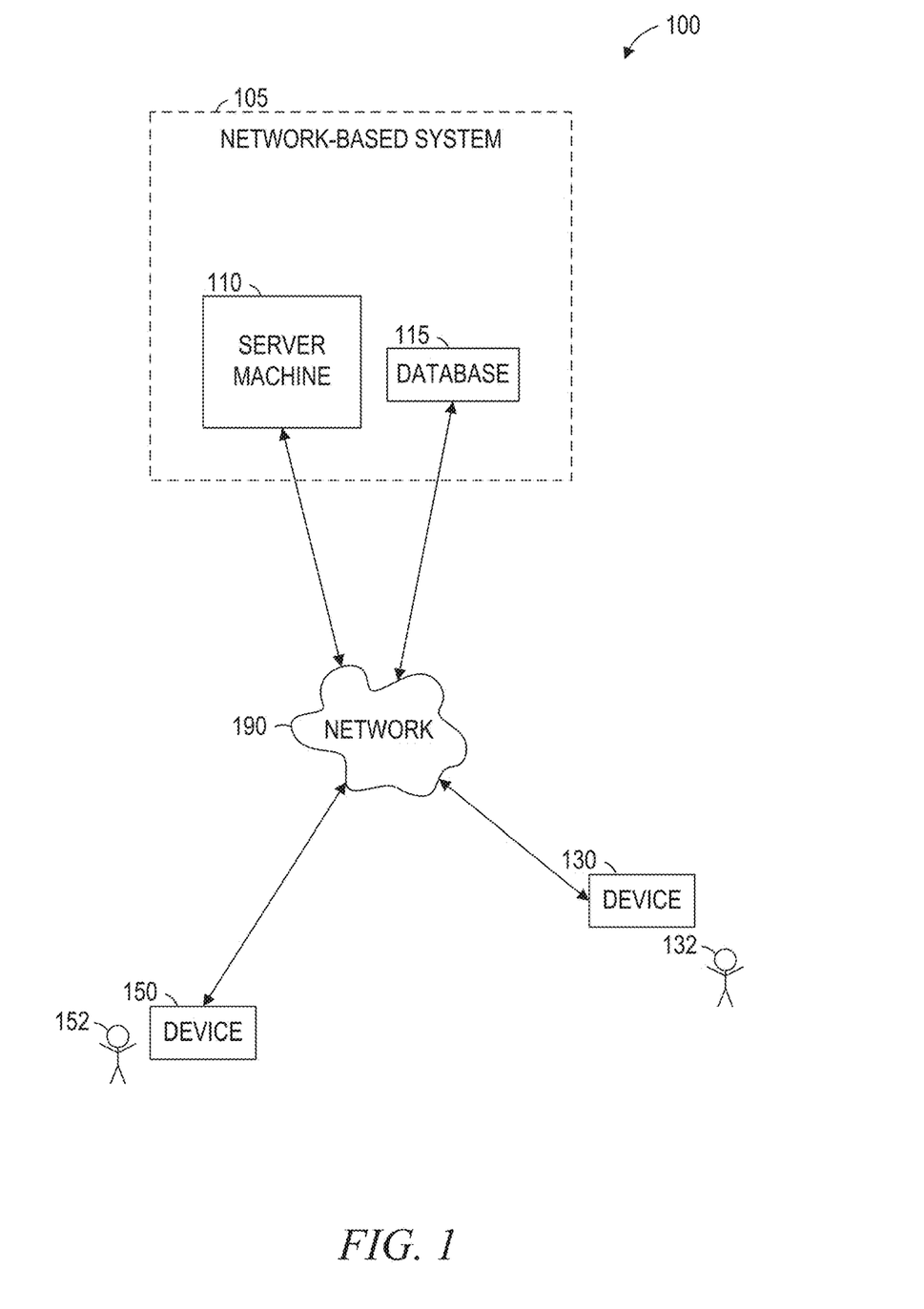
FIG. 1 is a network diagram illustrating a network environment suitable for a social network, according to some example embodiments.

FIG. 1 is a network diagram illustrating a network environment 100 suitable for a social network service, according to some example embodiments. The network environment 100 includes a server machine 110, a database 115, a first device 130 for a first user 132, and a second device 150 for a second user 152, all communicatively coupled to each other via a network 190. The server machine 110 may form all or part of a network-based system 105 (e.g., a cloud-based server system configured to provide one or more services to the devices 130 and 150). The database 115 can store member data (e.g., profile data, social graph data) for the social network service. The server machine 110, the first device 130, and the second device 150 may each be implemented in a computer system, in whole or in part, as described below with respect to FIG. 6.

Also shown in FIG. 1 are users 132 and 152. One or both of the users 132 and 1152 may be a human user (e.g., a human being), a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 1150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
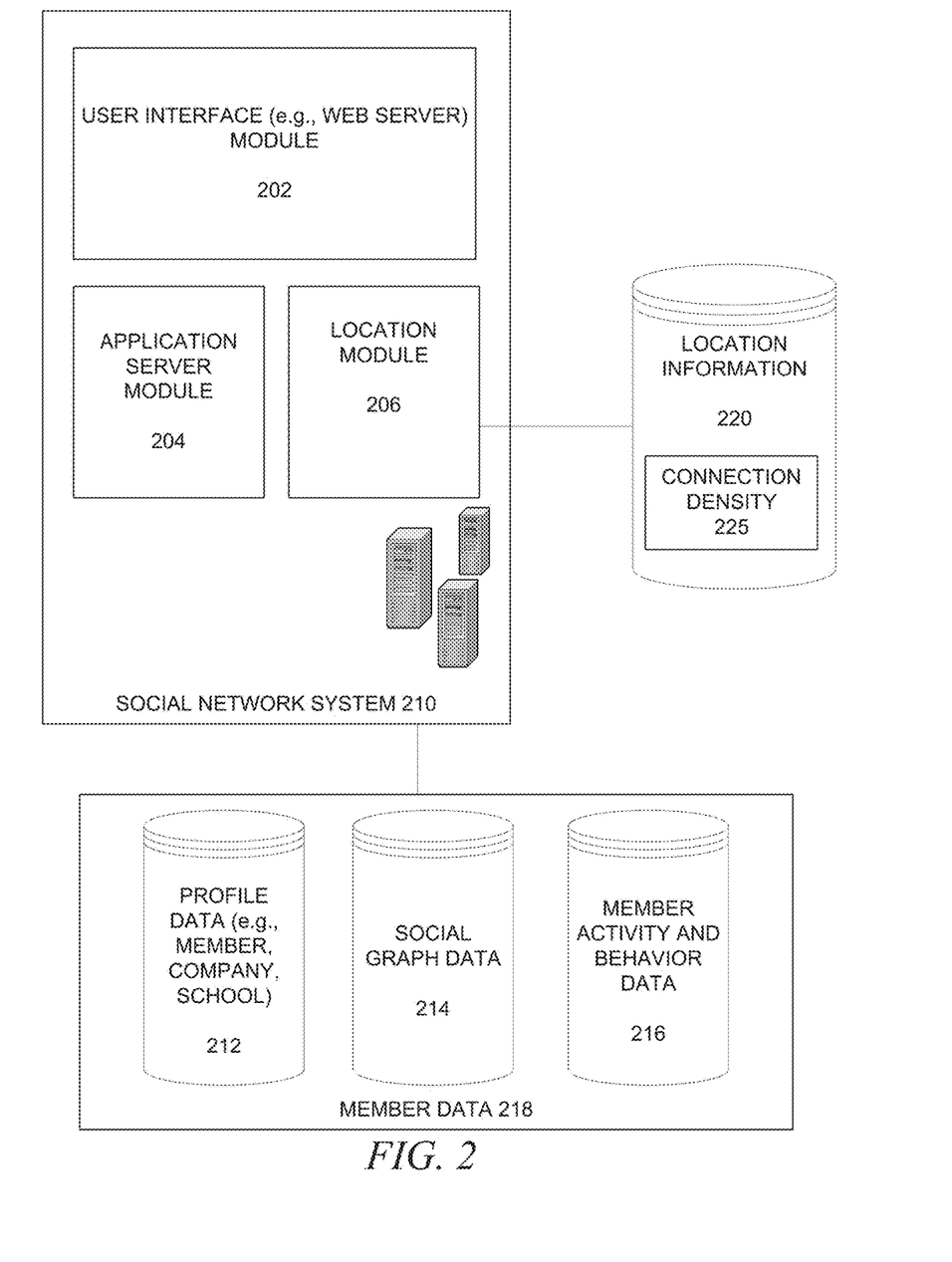
FIG. 2 a block diagram illustrating various modules of a social network service, according to some embodiments.

FIG. 2 is a block diagram illustrating components of a social network system 210 according to some example embodiments. The social network system 210 is an example of a network-based system 105 of FIG. 1. The social network system 210 can include a user interface module 202, an application server module 204, and a location module 206, all configured to communicate with each other (e.g., via a bus, shared memory, or a switch).

In some instances, the location module 206 can be configured to process data offline or periodically. For example, the location module 206 can include Hadoop servers that access member profile data periodically and update location information 220 based on the member profile data periodically (e.g., on a nightly basis). Processing the member profile data may be computationally intensive; therefore, due to hardware limitations and to ensure reliable performance of the social network, the determination of location data may be done offline.

Furthermore, the social network system 210 can communicate with database 115 of FIG. 1, such as a database storing member data 218. The member data 218 can include profile data 212, social graph data 214, and member activity and behavior data 216. Using member data 218, location information 220 can be determined. Additionally, connection density 225 can be determined based on member data 218.

In some instances, the location module 206 can be configured to process data offline or periodically. For example, the location module 206 can include Hadoop servers that access member profile data periodically and update location information 220 based on the member profile data periodically (e.g., on a nightly basis). Processing the member profile data may be computationally intensive; therefore, due to hardware limitations and to ensure reliable performance of the social network, the determination of location data may be done offline.

Figure 3:
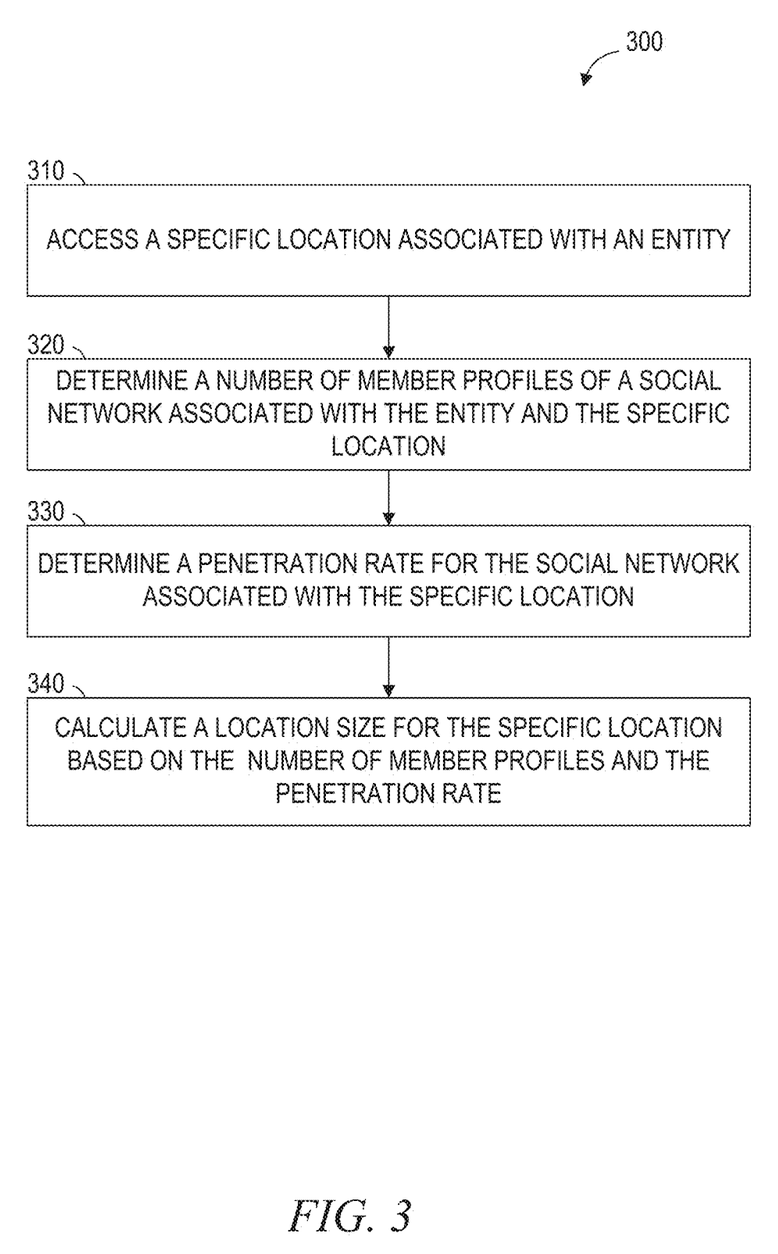
FIG. 3 is a flowchart illustrating a method for determining an entity's location size, according to some example embodiments.
Figure 4:
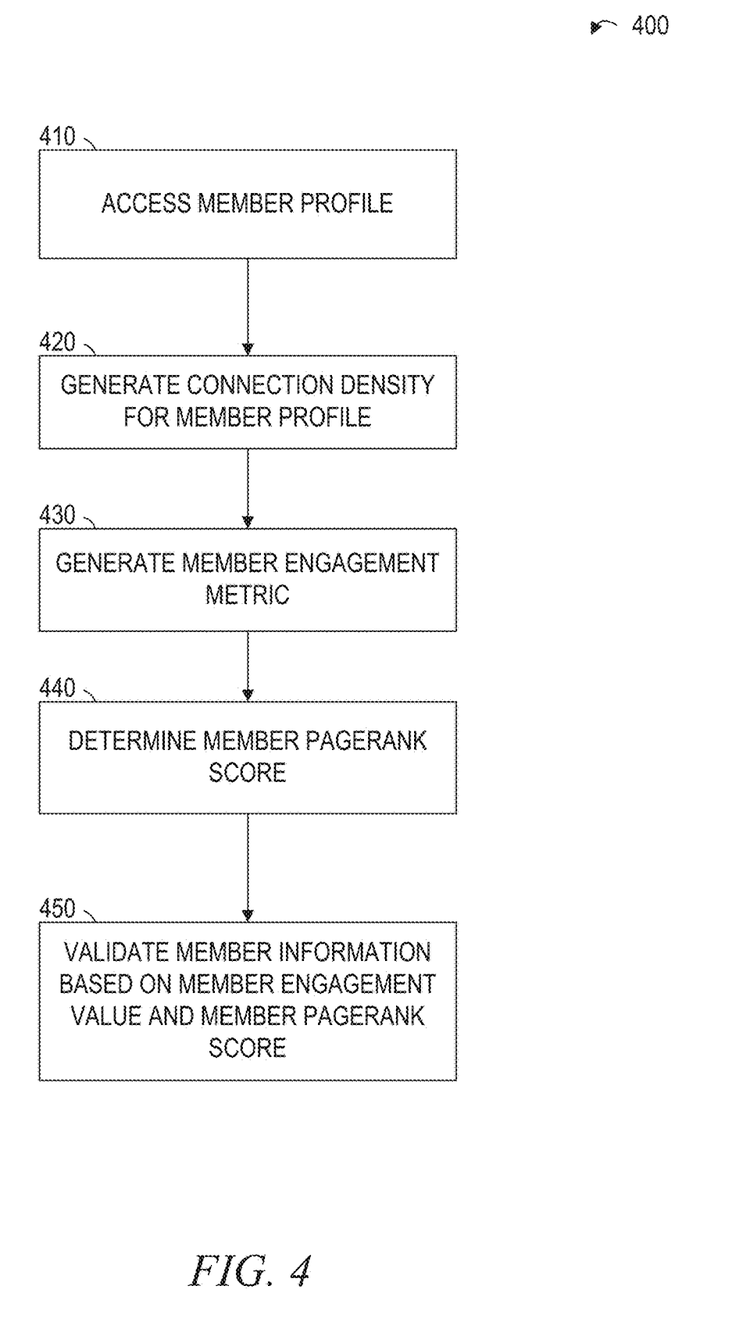
FIG. 4 is a flowchart illustrating a method for verifying member information, according to some example embodiments.

As will be further described with respect to FIGS. 3-4, the location module 206 in conjunction with the user interface module 202 and the application server module 204 can determine the location information 220 (e.g., entity's physical location, connection density 225) using member data 218.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

As shown in FIG. 2, the data layer includes several databases, such as a database for member data 218 for storing profile data 212, including both member profile data as well as profile data for various organizations. Additionally, the database for member data 218 can store social graph data 214 and member activity and behavior data 216.

In some embodiments, the member data 218 may be processed (e.g., real-time, background/offline) using the location module 206 to determine location information 220. Location information 220 can include a physical location of entity, the number of employees at the physical location, and a connection density 225. For example, if a member has provided information about various jobs the member has held with the same or different companies, and the physical location, this information can be used to derive location information 220.

Profile data 212 can be used to determine entities (e.g., company, organization) associated with a member. For instance, with many social network services, when a user registers to become a member, the member is prompted to provide a variety of personal and employment information that may be displayed in a member's personal web page. Such information is commonly referred to as profile data 212. The profile data 212 that is commonly requested and displayed as part of a member's profile includes a person's age, birthdate, gender, interests, contact information, residential address, home town and/or state, the name of the person's spouse and/or family members, educational background (e.g., schools, majors, matriculation and/or graduation dates, etc.), employment history, office location, skills, professional organizations, and so on. In some instances, profile data 212 can include company size, industry, function, seniority, skills, endorsements, recommendations, and geography.

In some embodiments, profile data 212 may include the various skills that each member has indicated he or she possesses. Additionally, profile data 212 may include skills for which a member has been endorsed in the profile data 212.

In some other embodiments, with certain social network services, such as some business or professional network services, profile data 212 may include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on.

Another example of profile data 212 can include data associated with an entity page (e.g., company page). For example, when a representative of an entity initially registers the entity with the social network service, the representative may be prompted to provide certain information about the entity. This information may be stored, for example, in the database 115, and display on an entity page.

Additionally, social network services provide their users with a mechanism for defining their relationships with other people. This digital representation of real-world relationships is frequently referred to as a social graph. As will be described later, social graph data 214 can be used to determine connection density 225.

In some instances, social graph data 214 can be based on an entity's presence within the social network service. For example, consistent with some embodiments, a social graph is implemented with a specialized graph data structure in which various entities (e.g., people, companies, schools, government institutions, non-profits, and other organizations) are represented as nodes connected by edges, where the edges have different types representing the various associations and/or relationships between the different entities.

Once registered, a member may invite other members, or be invited by other members, to connect via the social network service. A "connection" may have a bilateral agreement by the members, such that both members acknowledge the establishment of the connection. The connection relationship data can be stored in the social graph data 214.

Furthermore, the social graph data 214 can be maintained by a third party social network service. For example, users can indicate a relationship or association with a variety of real-world entities and/or objects. Typically, a user input is captured when a user interacts with a particular graphical user interface element, such as a button, which is generally presented in connection with the particular entity or object and frequently labelled in some meaningful way (e.g., "like," "+1," "follow").

Similarly, in some embodiments, a member may elect to "follow" another member. In contrast to establishing a connection, the concept of "following" another member typically is a unilateral operation, and at least in some embodiments, does not require acknowledgement or approval by the member being followed. When one member follows another, the member who is following may receive status updates or other messages published by the member being followed, or relating to various activities undertaken by the member being followed. According to some embodiments, follow data can be stored in the social graph data 214.

The connection density 225 can be based on connection data (e.g., bilateral agreement between members) or following data (e.g., unilateral operation). In any case, the various associations and relationships that the members establish with other members, or with other entities and objects, are stored and maintained within the social graph data 214.

The social graph data 214 can be used by the location module 206 to determine the connection density 225. The connection density 225 can be part of the location information 220.

The connection density 225 can be a factor in determining and verifying the number of members associated with the physical location. For members belonging to the same entity, location module 206 can determine how densely a member is connected to another member. For example, the connection density 225 can be used to determine if a member is working remotely, and thus the location is not an actual physical office location.

The connection density can be calculated for all the member profiles associated with the entity, or for a subgroup of the member profiles associated with the entity. Subgroups can be based on suggested locations, entity functions, years of experience of a member, or a title (e.g., director, vice-president) of a member. Entity functions can include member profiles associated with a specific function (e.g., human resources department, research and development, leadership team) within the entity. For example, the connection density can be calculated for the members associated with a suggested office location to determine if the members know each other. If the connection density is below a minimum threshold, then it may be inferred that the members are working remotely and that there is not a physical office location at that location.

Referring back to FIG. 2, in addition to hosting a vast amount of social graph data 214, many social network services maintain member activity and behavior data 216.

The social network service may provide a broad range of other applications and services that allow members the opportunity to share and receive information, often customized to the interests of the member. In some embodiments, members may be able to self-organize into groups, or interest groups, organized around subject matter or a topic of interest. In some embodiments, the social network service may host various job listings providing details of job openings with various organizations.

Furthermore, as members interact with the various applications, services, and content made available via the social network service, the members behavior (e.g., check-in at a location, content viewed, links selected, etc.) may be used to determine a location specific to the member. In some embodiments, location information can be based on the member activity and behavior data 216.

Online or web-based social network services can use member data (e.g., profile data 212, social graph data 214, member activity and behavior data 216) to determine location information 220 such as entity location information. Additionally, member data 218 can be used to determine a connection density 225 associated with a member to verify the location information. Accordingly, embodiments of the present disclosure can provide an entity's physical locations based on location information 220 and connection density 225.

FIG. 3 is a flowchart illustrating operations of location module 206 in performing a method 300 for determining entity location information, according to some example embodiments. Operations in the method 300 may be performed by network-based system 105, using modules described above with respect to FIG. 2. As shown in FIG. 3, the method 300 includes operations 310, 320, 330, and 340.

At operation 310, location module 206 can access a specific location associated with an entity. The specific location can be accessed from database 115 using network 190.

In some instances, location module 206 can determine the specific location associated with the entity, and store the specific location in database 115. Alternatively, a determination module can determine a specific location associated with the entity. The specific location can be a physical location based on member data 218. The physical location can be determined and verified using the connection density 225 of the member profiles associated with the physical location. U.S. Non-Provisional application Ser. No. 14/473,988, filed Aug. 29, 2014, titled "SURFACING AN ENTITY'S PHYSICAL LOCATIONS VIA SOCIAL GRAPH," which is incorporated herein by reference, further describes techniques for determining a specific location associated with an entity based on member data 218.

Location module 206 can access member data 218 to determine the employer of a member, in one embodiment, location module 206 just accesses profile data 212 to determine the employer of a member. Once the employer is determined, the location module 206 or the determination module can verify if a suggested location for the employer is a physical location using the connection density 225. Additionally, the connection density 225 can be used by location module 206 to verify that each member profile represents an actual employee of employer (e.g., Company A).

For example, location module 206 can group all member profiles that list Company A as their employer. These member profiles can be included in an entity group for Company A. Additionally, separate subgroups of the entity group for Company A can be created based on the different office locations of Company A. Furthermore, by having a minimum threshold for the connection density 225, location module 206 can more accurately determine physical locations associated with Company A. When the minimum threshold is surpassed, the location module 206 can present a confidence score based on the location information 220. Alternatively, the location module 206 can present a binary result (e.g., Yes, No) based on the location information 220.

For example, when an employer has n=10 employees, there are 45 ($45=\Sigma_{k=1}^{n}k-1=9+8+7+6+5+4+3+2+1$) unique first-degree connections. In some instances, when the minimum threshold for the connection density is preset at 20%, then there should be at least 9 connections (9=45*20%) for the location module 206 to determine with a high confidence level (e.g., 95% confidence level) that the location associated with the members is a physical location.

Moreover, the connection density can be dependent on the number of employees. In some instances, a higher connection density may be used for a smaller company, while a lower connection density can be used for a larger company. For example, it is less likely that an employee knows each and every other employee when the employer is a large company (e.g., 10,000+). Therefore, in one example, the minimum connection density threshold for a large company can be preset at 5%.

Furthermore, the connection density 225 can be calculated for the whole entity, or for each of the suggested locations based on the member profiles. The connection density can verify with high certainty that a suggested location is a specific location (e.g., an actual physical office location).

Alternatively, if the connection density is below the minimum threshold, then the location module 206 cannot determine that the suggested location is a specific location (e.g., physical office location) with a high confidence level. This may occur when a company hires satellite employees working at different locations (e.g., working at home). Accordingly, when the minimum connection density threshold is not met, location module 206 may infer that the employees at the suggested location do not know each other, and the suggested location is not a specific location (e.g., physical office location) for the company.

Referring back to method 300, at operation 320, location module 206 can determine a number of member profiles associated with the entity at the specific location. Location module 206 can access the profile data 212 from member data 218 to determine the number of member profiles associated with the entity at the specific location.

In some instances, a group of member profiles (e.g., 100 employees in Company A) can be associated with an entity (e.g., company, employer). Additionally, the entity may have multiple locations. Furthermore, location module 206 can use member data 218 to determine a subgroup of member profiles associated with the entity that are located at a specific location.

Continuing with the example from operation 310, location module 206 can determine that 10 employees of the 100 employees at Company A are located in Singapore. For example, location module 206 can determine that San Francisco and Singapore are the locations associated with the member profiles in the group for Company A. The location can be based on the location associated with a member or the location associated with the member's employer. Using the profile data 212, location module 206 can determine that Company A has 10 employees in Singapore. In one example, the determination can be based on tallying the number of member profiles that list Employer A as their employer, and that live in Singapore.

The location can include country, state, city, region, zip code, and street address. Additionally, the location can be based on other factors, such as a member's IP address or a location determination of a member's mobile device. The location determination of a member's mobile device can be based on Global Positioning System (GPS) technology or indoor position system (IPS) location determination technologies (e.g., Bluetooth).

In addition to the connection density, the social network system 210 can have a penetration rate of the social network at the location. Using the penetration rate, the location module 206 can determine the number of members associated with the location.

At operation 330, location module 206 can determine the penetration rate for the social network associated with the specific location. For example, location module 206 can use the determined penetration rate to determine the percentage of the local population that has membership to the social network.

The penetration rate for a social network can be dependent on location (e.g., country, state, city, region, zip code), business department (e.g., management team, engineering team, marketing team), age, behavior indicators, active mobile subscribers, active Internet users (e.g., Internet users in location), number of downloads of social network mobile applications, time spent on the Internet by Internet users, third-party social media users, and third-party social media penetration rate.

Continuing with the example from operations 310 and 320, the penetration rate of the social network system 210 in Singapore can be determined to be 20%. For example, location module 206 can determine that the population of Singapore is five million using census data, and can identify one million members of the social network system 210 living in Singapore to determine that the penetration rate is 20%.

At operation 340, location module 206 can calculate a location size for the specific location based on the number of member profiles and the penetration rate for the specific location. According to some embodiments, an estimate of the location size can be the number of member profiles associated with the entity at the specific location divided by the penetration rate for the social network associated with the specific location.

Continuing with the example from operations 310, 320, and 330, there are 10 Company A employees in Singapore on the social network system 210. Additionally, the penetration rate of the social network system 210 in Singapore is 20%. Therefore, location module 206 can calculate that the Singapore office of Company A has about 50 employees.

According to another embodiment, location module 206 can give a range for the number of employees at a specific location. The range can include 1-4 employees; 5-9 employees; 10-19 employees; 20-49 employees; 50-99 employees; 100-249 employees; 249-499 employees; 500-999 employees; 1,000-4,999 employees; 5,000-9,999 employees; and 10,000+ employees. According to another embodiment, the range can be set by the location module 206 based on location information 220, or the range can be set by an administrator of the social network system 210.

Optionally, location information (e.g., number of employees) can be stored over a period of time in a historical location system. The social network system 210 can use the historical location system to present how an entity is growing in members at different locations. For example, the social network system 210 can present a timeline of the growth of a company based on office development.

In some instances, location module 206 can determine the connection density 225 for each member associated with a first location (e.g., Singapore). The connection density can determine whether the location is a physical office location, and whether the member is an actual employee. Furthermore, if the connection density for the members at the first location is higher than the minimum threshold, location module 206 can determine with a high confidence level that there is a physical office at the first location, or that the members are actual employees of the entity. Accordingly, when the connection density ratio is higher than a predetermined threshold value, the location module 206 can infer that the member in the first location is well connected. As a result, location module 206 can determine with a high confidence level (e.g., 95% confidence level) the number of employees in the first location.

For example, the members of the group may be well connected if the connection density 225 is above a threshold value, which would imply that there is a physical office location, and the member is an actual employee. Additionally, the potential number of unique connections can be used in determining a connection density ratio for each employee or for each location. Furthermore, an average connection density ratio of all employees in the company may be computed as a baseline connection density ratio for all employees of the company. The minimum threshold value can be a percentage (e.g., 50%) of the baseline connection density ratio.

As previously discussed with respect to FIG. 2, location module 206 can determine a connection density 225 by identifying a set of connection paths connecting a plurality of member profiles. Additionally, a path score for each connection path identified may be generated. For example, the path score for each individual connection path may be dependent upon individual edge scores (e.g., based on first-degree or second-degree connection) assigned to the edges connecting the nodes (e.g., member profiles) in the connection path. Different algorithms may be used to derive path scores for different applications or tasks. The particular algorithm used to derive the path score may be dynamically selected, for example, based on a determination of what the system or user is attempting to achieve. Consequently, the edge scores or weights for different edge types may be derived differently, for example, to increase or decrease the influence of edge scores of certain types of edges on the path score, depending upon the particular application that has been invoked, or a particular task or process being performed.

In one example embodiment, only bilateral relationships (e.g., relationships that have been acknowledged by both people in the relationship) are considered for determining the connection density 225 and the path score. In another example embodiment, relationships acknowledged by only one member in the relationship or relationships that have not been acknowledged by members in the relationship are considered.

A connection density ratio for a selected person may be defined, for example, as the actual number of connections of the selected member to other members of the group divided by the potential number of connections of the selected member. The number of connections can be based on first-degree connections, second-degree connections, and so on. First-degree connections can be direct bilateral connections between two members. When Members A and B have a first-degree connection, and Members B and C have a first-degree connection, then the connection between member A and C is an example of a second-degree connection.

Moreover, based on the connection density of a particular subgroup, additional information can be inferred. For example, when the connection density associated with the executives of an entity at a particular location is high, location module 206 can determine that particular location to be the entity's headquarters.

According to another embodiment, the number of employees at a specific location for a particular business team within the company can be determined. For example, using the connection density of a particular subgroup (e.g., management team, engineering team, marketing team), the number of members associated with the particular subgroup at the specific location, and the penetration rate, the location module 206 can determine the size of the particular business team (e.g., marketing team) at the specific location.

FIG. 4 is a flowchart illustrating operations of location module 206 in performing a method 400 for detecting whether a member is an actual employee of a given company, in accordance to another embodiment of the present disclosure. Operations in the method 400 may be performed by network-based system 105, using modules described above with respect to FIG. 2. As shown in FIG. 4, the method 400 includes operations 410, 420, 430, 440, and 450.

At operation. 410, location module 206 can access a member profile from member data 218. The user interface module 202, application server module 204, and location module 206 in the social network system 210 are configured to communicate with each other (e.g., via a bus, shared memory, or a switch) to access the member profile from database 115.

At operation 420, location module 206 can calculate connection densities for the member profile. For example, the connection density can be calculated as described in, but not limited to, FIGS. 2-3. For example, location module 206 can infer that when members in a given entity are tightly connected to each other, the entity has a higher probability of existing. The connection between members can be measured using the connection density.

At operation 430, location module 206 can generate a member engagement value (e.g., member engagement metric). The member engagement value can be generated based on member data 218, which includes member activity and behavior data 216. For example, when a member is very active on a social network system 210, the member has a higher probability of existing and being an employee of a company identified on the member profile. The activity of a member is measured using the member engagement value based on member engagement and usage.

At operation 440, location module 206 can determine a pagerank score for the member. The location module can access pagerank data for pagerank computations. Additionally, location module 206 can compute the member's pagerank score based on the accessed pagerank data. For example, when a member in a given entity is highly influential in the social graph, the member is more likely to exist. The social graph can be accessed from the social graph data 214, and measured by the pagerank score of members.

In some instances, the computed pagerank score for the member from operation 440 and the generated member engagement value from operation 430 can be stored as member data 218.

At operation 450, location module 206 can validate member information based on the generated member engagement value and the member pagerank score. Furthermore, after the validity of a member has been determined, location module 206 can use member data 218 to confidently (e.g., 95% confidence level) infer company attributes (e.g., number range of employees at a specific location).

According to some embodiments, a threshold-based approach (e.g., pre-determined minimum threshold value) as illustrated in FIGS. 3-4 can be used to determine if an entity exists. Alternatively, a machine-learning-based solution can be used to dynamically determine if an entity exists. The machine-learning can be based on training data, which can be labeled automatically by the location module 206.

Figure 5:
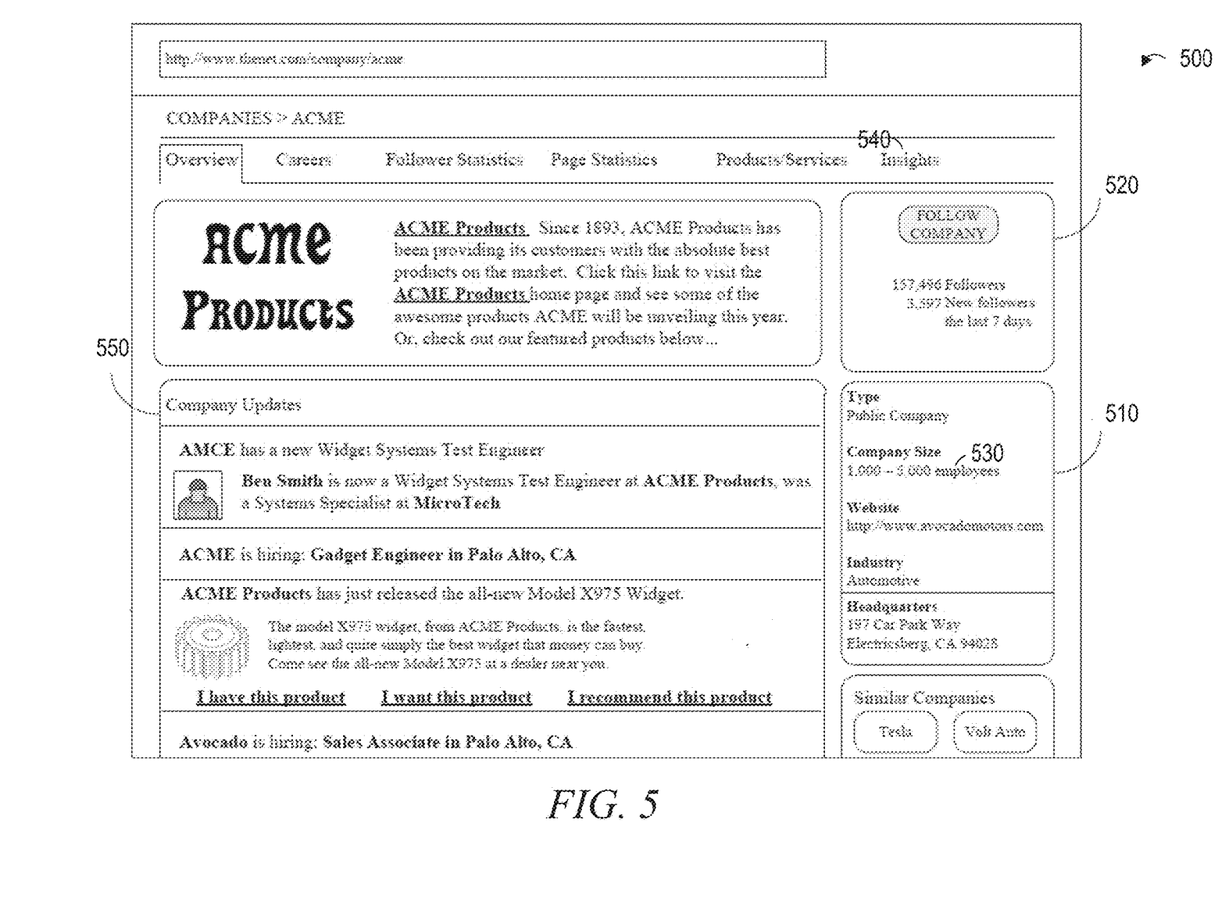
FIG. 5 is a user interface diagram illustrating an example of a company page presenting information about a company, according to some example embodiments.

FIG. 5 is a user interface diagram illustrating an example of a user interface or web page (e.g., a company page) 500 presenting various information about a company, including an activity stream showing various messages or status updates published, on behalf of the company, by authorized representatives of the company, consistent with some embodiments. As illustrated in FIG. 5, the example web page is for a company with the name, ACME Products. In this example, the company page 500 for ACME Products is hosted by the social network service 210. However, in alternative embodiments, a third party or the company itself may host the company page. In any case, members of the social network service who may be interested in the company can access the company page for ACME Products to view a variety of information about the company.

For instance, in the example of FIG. 5, the company page for ACME Products presents a brief history and background of the company 510, as well as information about the number of members who are following the company 520. In the background of the company, the company size 530 can be presented. As described with respect to FIGS. 2-4, location module 206 using method 300 can determine the company size 530 based on member data 218. Additionally, location module 206 using method 400 can verify the member information used in method 300 to calculate the company size 530.

Consistent with some embodiments, a company page may include a navigation bar with a variety of tabs relating to specific topical categories. For instance, in the example of FIG. 5, the company page for ACME Products includes a navigation bar showing tabs for "Overview," "Careers," "Follower Statistics," "Page Statistics," "Products and Services," and "Insights." In some embodiments, selecting a particular tab will cause the content of the page to change, such that content relating to the selected tab is presented. Similarly, the content may be personalized based on the identity of the member viewing the content, such that an authorized administrator or representative of the company may view certain information that is not viewable by ordinary members.

In some embodiments, the company page may include a tab associated with content relating to various insights about the company as derived from member data 218 and location information 220. For example, in connection with the "Insights" tab 540 in the example web page of FIG. 5, a viewing member may be presented with information identifying members of the social network service who are employed at ACME Products and who have new job titles, or information about members who have recently departed ACME Products for a new company. In addition, the viewing member may be presented with information about the number of members of the social network service who are in the viewing member's social graph (e.g., first-degree or direct connections, followers, etc.) and who are employed at ACME Products calculated using method 300. The company page may present statistical information about the geographical location of residences of the employees of the company. Of course, other insightful information may be presented as well, such as the top companies that employees of ACME Products went to subsequent to departing ACME Products.

Referring again to FIG. 5, various items of content are shown in separate content modules. In the portion of the example user interface with company updates 550, the company page presents a user interface for a data feed, generally referred to as an activity stream, content stream, or company updates stream, via which messages or status updates published on behalf of the company are presented.

According to various example embodiments, one or more of the methodologies described herein may facilitate the determination of the number of employees at a specific office location. With regards to marketing or other purposes, such firmographic information can be more valuable than company information that is publicly available.

When these effects are considered in aggregate, one or more of the methodologies described herein may obviate a need for certain human efforts or resources that otherwise would be involved in determining entity size at a specific location. Additionally, computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 6:
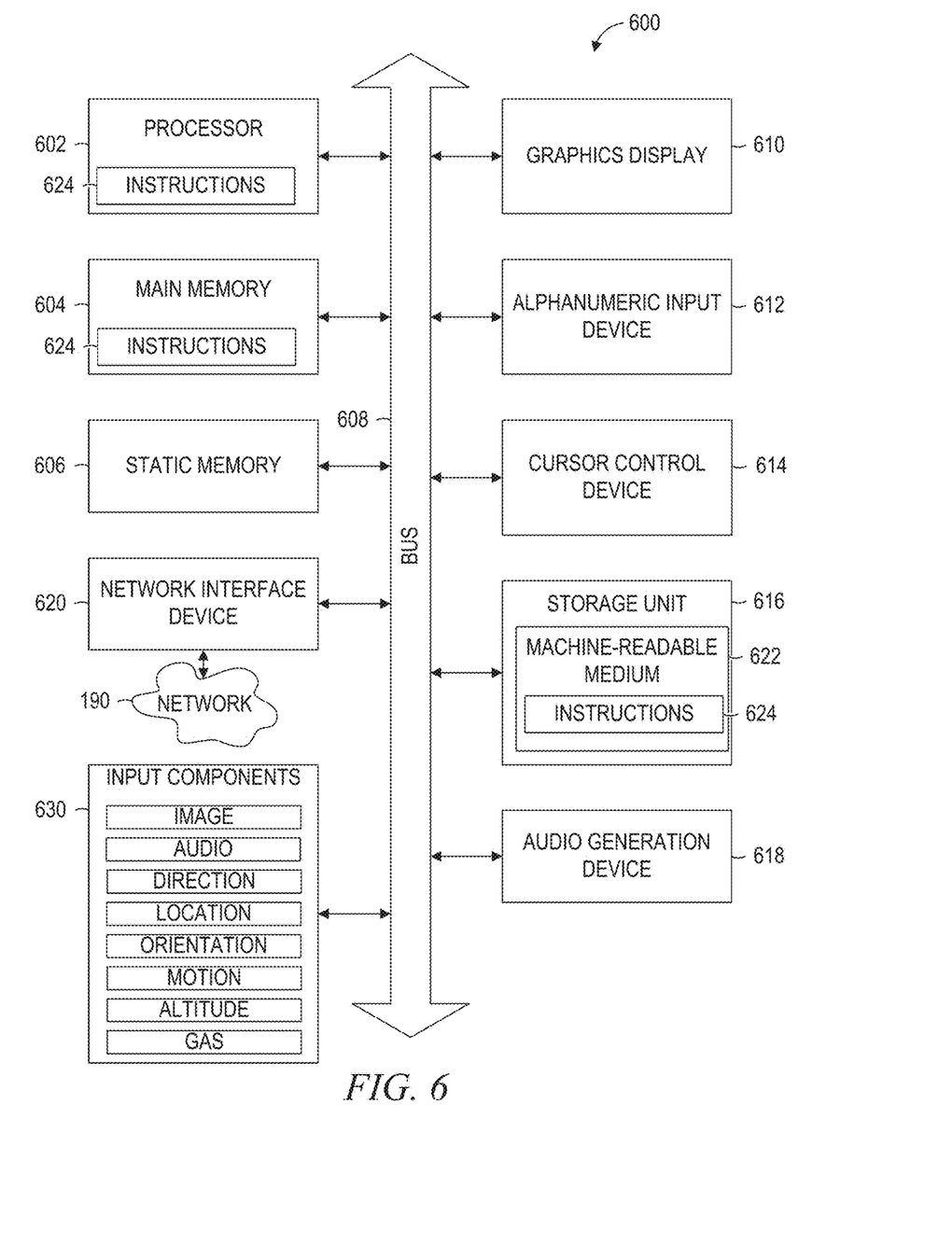
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine is illustrated, the term. "machine" shall also be taken to include any collection of machines that individually or jointly execute the instructions 624 to perform all or part of any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or another pointing instrument), a storage unit 616, an audio generation device 618 (e.g., a sound card, an amplifier, a speaker, a headphone jack, or any suitable combination thereof), and a network interface device 620.

The storage unit 616 includes the machine-readable medium 622 (e.g., a tangible and non-transitory machine-readable storage medium) on which are stored the instructions 624 embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered machine-readable media (e.g., tangible and non-transitory machine-readable media). The instructions 624 may be transmitted or received over the network 190 via the network interface device 620. For example, the network interface device 620 may communicate the instructions 624 using any one or more transfer protocols (e.g., HTTP).

In some example embodiments, the machine 600 may be a portable computing device, such as a smartphone or tablet computer, and have one or more additional input components 630 (e.g., sensors or gauges). Examples of such input components 630 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive unless specifically stated otherwise.

What is claimed is:

1. A method comprising:
    accessing, using a network interface device, member profiles of a social network that are associated with an entity, yielding entity-related member profiles, each of the entity-related member profiles including data indicating that a respective user associated with the entity-related member profile is currently employed by the entity;
    determining, using a processor, a number of the entity-related member profiles that are associated with a specific geographic location, yielding a number of location specific entity-related member profiles;
    determining a penetration rate for the social network in the specific geographic location, the penetration rate indicating a percentage of people residing within the specific geographic location that have created member profiles on the social network;
    dividing the number of location specific entity-related member profiles by the penetration rate, yielding an estimated number of employees of the entity residing in the specific geographic location;
    updating an entity profile associated with the entity based on the estimated number of employees of the entity residing in the specific geographic location;
    for each entity-related member profile, calculating a pagerank value, the pagerank value corresponding to a probability that a user accesses the respective entity-related member profile; and
    for each entity-related member profile that has a pagerank value that meets or exceeds a threshold pagerank value, incrementing the estimated number of employees of the respective entity residing in the specific geographic location.

2. The method of claim 1, wherein determining the number of entity-related member profiles that are associated with the specific geographic location comprises:
    for each entity-related member profile, calculating a connection density; and
    for each entity-related member profile determined to have a connection density that meets or exceeds a threshold connection density, incrementing the number of entity-related member profiles that are associated with the specific geographic location.

3. The method of claim 1, wherein determining the number of entity-related member profiles that are associated with the specific geographic location comprises:
    for each entity-related member profile, calculating a member engagement value, the member engagement value corresponding to an amount of usage of the social network by the respective entity-related member profile; and
    for each entity-related member profile that has an engagement value that meets or exceeds a threshold engagement value, incrementing the number of entity-related member profiles that are associated with the specific geographic location.

4. The method of claim 1, further comprising:
    presenting, a webpage corresponding to the entity profile, the webpage including the estimated number of employees of the entity residing in the specific geographic location.

5. The method of claim 1, further comprising:
    receiving a user input corresponding to a company size at the specific location; and
    verifying the company size at the specific location based on the estimated number of employees of the entity residing in the specific geographic location.

6. The method of claim 1, further comprising:
    receiving a user input corresponding to a company size for the entity; and
    verifying the company size based on the estimated number of employees of the entity residing in the specific geographic location and one or more other location sizes for one or more other locations associated with the entity.

7. The method of claim 1, wherein the penetration rate for the social network in the specific geographic location is determined based on a number of active Internet users for the specific geographic location.

8. The method of claim 1, wherein the penetration rate for the social network in the specific geographic location is determined based on a penetration rate for a business department associated with the location specific entity-related member profiles.

9. The method of claim 1, wherein the penetration rate for the social network in the specific geographic location is determined based on social graph data for the location-related location specific entity-related member profiles.

10. The method of claim 1, wherein the penetration rate for the social network in the specific geographic location is determined based on member activity and behavior data for the location specific entity-related member profiles.

11. A system comprising:
one or more computer processors; and
one or more computer-readable mediums storing instructions that, when executed by the one or more computer processors, cause the system to perform operations comprising:
accessing member profiles of a social network that are associated with an entity, yielding entity-related member profiles, each of the entity-related member profiles including data indicating that a respective user associated with the entity-related member profile is currently employed by the entity;
determining a number of the entity-related member profiles that are associated with a specific geographic location, yielding a number of location specific entity-related member profiles;
determining a penetration rate for the social network in the specific geographic location, the penetration rate indicating a percentage of people residing within the specific geographic location that have created member profiles on the social network;
dividing the number of location specific entity-related member profiles by the penetration rate, yielding an estimated number of employees of the entity residing in the specific geographic location;
updating an entity profile associated with the entity based on the estimated number of employees of the entity residing in the specific geographic location;
for each entity-related member profile, calculating a pagerank value, the pagerank value corresponding to a probability that a user accesses the respective entity-related member profile; and
for each entity-related member profile that has a pagerank value that meets or exceeds a threshold pagerank value, incrementing the estimated number of employees of the respective entity residing in the specific geographic location.

12. The system of claim 11, wherein determining the number of entity-related member profiles that are associated with the specific geographic location comprises:
for each entity-related member profile, calculating a connection density; and
for each entity-related member profile determined to have a connection density that meets or exceeds a threshold connection density, incrementing the number of entity-related member profiles that are associated with the specific geographic location.

13. The system of claim 11, wherein determining the number of entity-related member profiles that are associated with the specific geographic location comprises:
for each entity-related member profile, calculating a member engagement value, the member engagement value corresponding to an amount of usage of the social network by the respective entity-related member profile; and
for each entity-related member profile that has an engagement value that meets or exceeds a threshold engagement value, incrementing the number of entity-related member profiles that are associated with the specific geographic location.

14. The system of claim 11, the operations further comprising:
presenting, a webpage corresponding to the entity profile, the webpage including the estimated number of employees of the entity residing in the specific geographic location.

15. The system of claim 11, the operations further comprising:
receiving a user input corresponding to a company size at the specific location; and
verifying the company size at the specific location based on the estimated number of employees of the entity residing in the specific geographic location.

16. The system of claim 11, the operations further comprising:
receiving a user input corresponding to a company size for the entity; and
verifying the company size based on the estimated number of employees of the entity residing in the specific geographic location and one or more other location sizes for one or more other locations associated with the entity.

17. The system of claim 11, wherein the penetration rate for the social network in the specific geographic location is determined based on a number of active Internet users for the specific geographic location.

18. The system of claim 11, wherein the penetration rate for the social network in the specific geographic location is determined based on a penetration rate for a business department associated with the location specific entity-related member profiles.

19. A non-transitory computer-readable medium storing instructions that, when executed by one or more computer processors of a computing system, cause the computing system to perform operations comprising:
accessing member profiles of a social network that are associated with an entity, yielding entity-related member profiles, each of the entity-related member profiles including data indicating that a respective user associated with the entity-related member profile is currently employed by the entity;
determining a number of the entity-related member profiles that are associated with a specific geographic location, yielding a number of location specific entity-related member profiles;
determining a penetration rate for the social network in the specific geographic location, the penetration rate indicating a percentage of people residing within the specific geographic location that have created member profiles on the social network;
dividing the number of location specific entity-related member profiles by the penetration rate, yielding an estimated number of employees of the entity residing in the specific geographic location;
updating an entity profile associated with the entity based on the estimated number f employees of the entity residing in the specific geographic locations;
for each entity-related member profile, calculating a pagerank value, the pagerank value corresponding to a probability that a user accesses the respective entity-related member profile; and for each entity-related member profile that has a pagerank value that meets or exceeds a threshold pagerank value, incrementing the estimated number of employees of the respective entity residing in the specific geographic location.

\* \* \* \* \*

UNITED STATES PATENT AND TRADEMARK OFFICE
CERTIFICATE OF CORRECTION

| | | |
|---|---|---|
| PATENT NO. | : 10,044,775 B2 | Page 1 of 1 |
| APPLICATION NO. | : 14/474009 | |
| DATED | : August 7, 2018 | |
| INVENTOR(S) | : Guo et al. | |

It is certified that error appears in the above-identified patent and that said Letters Patent is hereby corrected as shown below:

On the Title Page

On page 2, in Column 2, under "Other Publications", Line 17, delete "141473,988," and insert --14/473,988,-- therefor

On page 2, in Column 2, under "Other Publications", Line 38, delete "Determing" and insert --Determining-- therefor In the Claims In Column 20, Line 64, in Claim 19, delete "f" and insert --of-- therefor In Column 20, Line 65, in Claim 19, delete "locations;" and insert --location;-- therefor Signed and Sealed this
Twenty-eighth Day of May, 2019

Andrei Iancu
*Director of the United States Patent and Trademark Office*